UNITED STATES PATENT OFFICE.

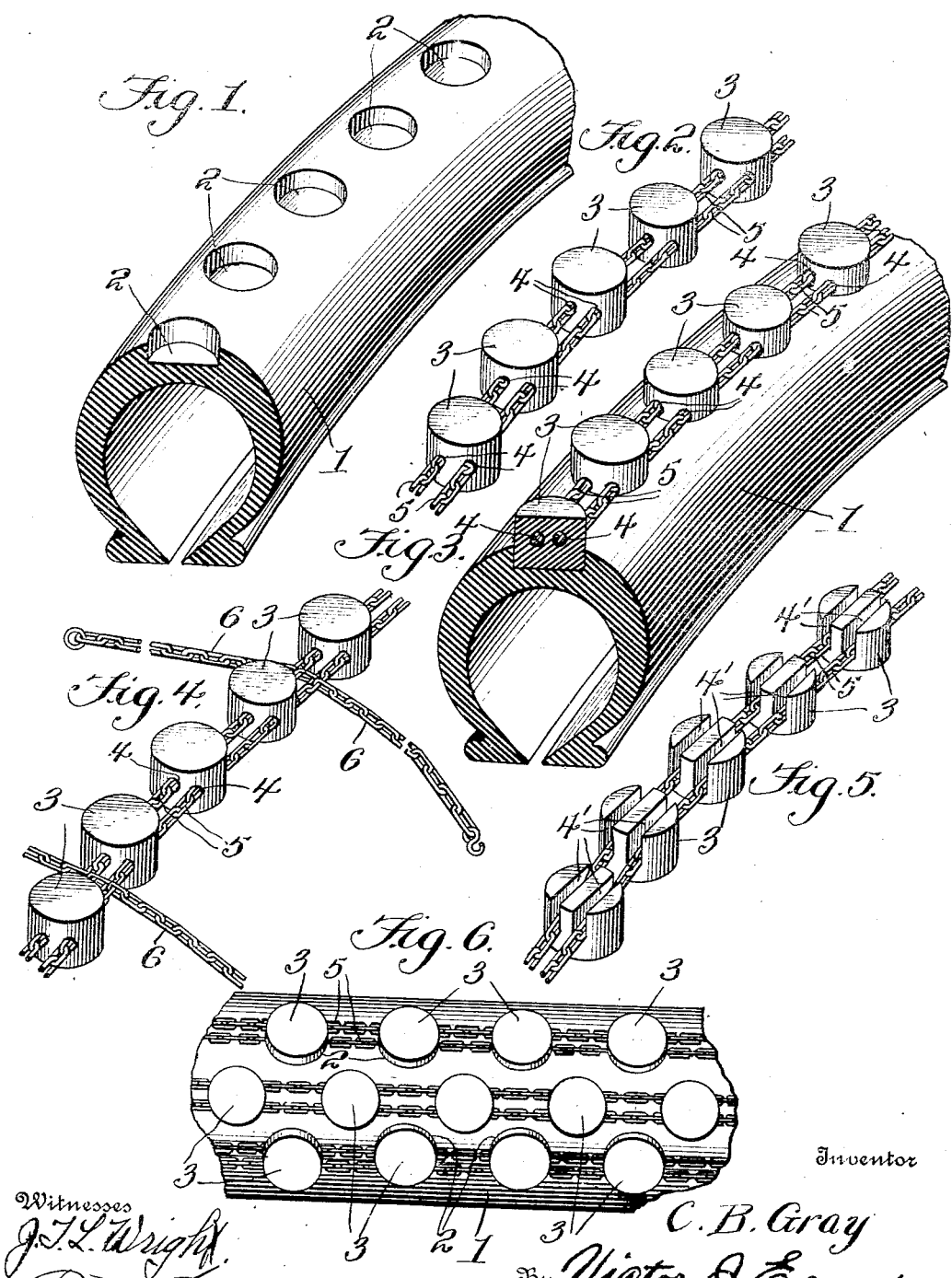
C. B. GRAY.
DETACHABLE TIRE TREAD.
APPLICATION FILED JAN. 24, 1914.
1,149,749. Patented Aug. 10, 1915.

CARLISLE B. GRAY, OF GLOVERSVILLE, NEW YORK.

DETACHABLE TIRE-TREAD.

1,149,749.

Specification of Letters Patent.    Patented Aug. 10, 1915.

Application filed January 24, 1914. Serial No. 814,160.

*To all whom it may concern:*

Be it known that I, CARLISLE B. GRAY, a citizen of the United States, residing at Gloversville, in the county of Fulton and State of New York, have invented new and useful Improvements in Detachable Tire-Treads, of which the following is a specification.

This invention relates to detachable tire treads, the object of the invention being to provide a novel quick detachable non-skid tread for tires such as are now in common use on automobiles, motor trucks and the like, which detachable tread may be quickly applied and removed and which may be renewed in whole or in part as frequently as necessary and with a minimum amount of trouble and without the services of a skilled mechanic. By means of this invention the non-skid properties of the tire may be indefinitely maintained in perfect operative condition at a minimum expense.

With the above and other objects in view, the invention consists in the novel construction, combination and arrangements of parts, as will hereinafter be more fully described, illustrated and claimed.

In the accompanying drawings: Figure 1 is a perspective view of a short section of the outer case of a pneumatic tire prepared in accordance with the present invention. Fig. 2 is a similar view of a portion of the endless chain of plugs. Fig. 3 is a similar view showing the plugs applied to the tire. Fig. 4 is a view similar to Fig. 3 showing the use of lateral stay chains in connection with the plug restraining chains. Fig. 5 represents another embodiment of the idea. Fig. 6 is a plan view of a portion of the tread of a tire showing separate sets or rows of plugs and chains.

In carrying out the present invention, the outer case of a pneumatic tire designated at 1 is provided in the tread surface thereof with one or more longitudinal rows or series of sockets 2 extending only part way through the tread surface of the tire.

In connection with the sockets 2 is a corresponding number of detachable non-skid plugs 3 preferably of rubber or analogous material, each of said plugs being provided with one or more channels 4 extending in a plane parallel to the diametrical line thereof and adapted to receive one or more endless chains 5 which chain or chains are adapted to slide through the channels 4 in the plugs so that said plugs may adjust themselves readily to the positions of the sockets 2 in the tire 1. This greatly facilitates the application of the endless chain of plugs to the tire.

In Fig. 2 the channels 4 are shown in the form of holes extending through the plug about midway between the inner and outer surfaces thereof so as to lie in close contact with the tread surface of the tire 1. In Fig. 5, the channels 4' are shown in the form of grooves extending from the outer face of each plug 3 inwardly about half-way through the plug, in which grooves or channels the chain or chains lie. Under both constructions, however, each plug bears a sliding relation to the restraining chain 5. Either a single chain may be used in connection with a circular series of plugs 3 or a plurality of chains may be so used.

It is also desirable to use lateral stay chains 6 adapted to extend transversely around the tire 1 and also around the wheel rim and felly, the said stay chains 6 being located at suitable intervals and being attached to the restraining chain or chains 5. The plugs 3 are of greater depth than the sockets 2 so that said plugs will protrude or project beyond the tread surface of the tire 1 to obtain the non-skid action.

Any desired number of rows or chains of plugs may be used in connection with a single tire to proportionately increase the non-skid quality thereof and, of course, the particular shape of the plugs may be varied from that illustrated in the drawings without departing from the principle or sacrificing any of the advantages of the invention. The ends of the restraining chains may be detachably connected together to allow old plugs to be slid therefrom and new plugs slid thereon. The complete endless chain of plugs may be applied to the tire 1 in a deflated condition and when the tire is inflated there is no possibility of the chain or plugs becoming detached therefrom. The restraining chains, as well as the lateral stay chains will also add to the non-skid quality of the tire in connection with which the quick detachable tread is used.

What I claim is:—

1. A detachable non-skid tread for tires comprising in combination with a tire tread formed with cylindrical plug sockets, an endless series of cylindrical plugs each having one end only seated in one of said sockets and of a depth greater than the depth of said socket, whereby said plug protrudes at one end in the shape of a cylindrical knob beyond the outer face of the tread surface of the tire, and a flexible plug-restraining chain relatively to which said plugs are slidable, said chain passing transversely through said plugs between the outer and inner ends thereof and in line with the tread surface of the tire against which said chain rests.

2. A detachable non-skid tread for tires comprising in combination with a tire tread formed with cylindrical plug sockets, an endless series of cylindrical plugs each having one end only seated in one of said sockets and of a depth greater than the depth of said socket, whereby said plug protrudes at one end in the shape of a cylindrical knob beyond the outer face of the tread surface of the tire, a flexible plug-restraining chain relatively to which said plugs are slidable, said chain passing transversely through said plugs between the outer and inner ends thereof, and lateral tire-embracing stay chains attached to said restraining chain between said plugs.

3. A detachable non-skid tread for tires comprising in combination with a tire tread formed with cylindrical plug sockets, an endless series of cylindrical plugs each having one end only seated in one of said sockets and of a depth greater than the depth of said socket, whereby said plug protrudes at one end in the shape of a cylindrical knob beyond the outer face of the tread surface of the tire, and parallel flexible plug-restraining chains relatively to which said plugs are slidable, said chains passing transversely through said plugs between the outer and inner ends thereof, said plugs being formed with channels through which said chains pass.

In testimony whereof I affix my signature in presence of two witnesses.

CARLISLE B. GRAY.

Witnesses:
HOWARD BAXTER,
JOSEPH B. DAVIS.